(12) United States Patent
Yohata et al.

(10) Patent No.: US 11,537,717 B2
(45) Date of Patent: Dec. 27, 2022

(54) INFORMATION PROCESSING APPARATUS

(71) Applicant: DENSO TEN Limited, Kobe (JP)

(72) Inventors: Hironori Yohata, Kobe (JP); Shigeto Umeyama, Kobe (JP); Naoto Mori, Kobe (JP)

(73) Assignee: DENSO TEN Limited, Kobe (JP)

( * ) Notice: Subject to any disclaimer, the term of this patent is extended or adjusted under 35 U.S.C. 154(b) by 374 days.

(21) Appl. No.: 16/814,007

(22) Filed: Mar. 10, 2020

(65) Prior Publication Data

US 2021/0034749 A1    Feb. 4, 2021

(30) Foreign Application Priority Data

Jul. 31, 2019    (JP) .............................. JP2019-141154

(51) Int. Cl.
| | | |
|---|---|---|
| G06F 21/57 | (2013.01) | |
| B60W 50/00 | (2006.01) | |
| G06F 7/58 | (2006.01) | |
| G05B 19/042 | (2006.01) | |
| G06F 8/65 | (2018.01) | |
| G06F 21/44 | (2013.01) | |
| G05B 23/02 | (2006.01) | |

(52) U.S. Cl.
CPC .......... G06F 21/572 (2013.01); B60W 50/00 (2013.01); G05B 19/0426 (2013.01); G06F 7/58 (2013.01); G06F 8/65 (2013.01); G06F 21/44 (2013.01); *B60W 2050/0083* (2013.01); *G05B 2219/2637* (2013.01); *G06F 2221/034* (2013.01)

(58) Field of Classification Search
CPC . G06F 21/572; G06F 7/58; G06F 8/65; G06F 21/44; G06F 2221/034; G06F 7/582; B60W 50/00; B60W 2050/0083; G05B 19/0426; G05B 2219/2637; G05B 23/0213; G05B 2219/24065
USPC .......................................................... 726/18
See application file for complete search history.

(56) References Cited

U.S. PATENT DOCUMENTS

| | | | |
|---|---|---|---|
| 2015/0012750 A1* | 1/2015 | Matsumoto ........... | H04L 63/061 713/171 |
| 2019/0286421 A1* | 9/2019 | Felber ..................... | G06F 7/588 |
| 2020/0151077 A1* | 5/2020 | Wong ...................... | G06F 7/588 |
| 2022/0156057 A1* | 5/2022 | Kobayashi .............. | B60R 16/02 |

FOREIGN PATENT DOCUMENTS

| | | |
|---|---|---|
| JP | 2015-014910 A | 1/2015 |
| WO | 03/104969 A2 | 12/2003 |

* cited by examiner

*Primary Examiner* — Michael J Brown
(74) *Attorney, Agent, or Firm* — Oliff PLC (57) ABSTRACT

An authentication unit of an information processing apparatus authenticates an update control device that controls update of a control program by using a random number generated by a random number generation unit. In the random number generation unit, a first extraction unit extracts a bit value from a count value of a first clock signal, a calculation unit performs logical operation on the bit value extracted by the first extraction unit and a target bit value at a bit position included in an entropy as an update position that is designated, a replacement unit replaces the bit value at the update position with a result of the logical operation a position designation unit designates a new update position after the bit value is replaced, and an output unit generates the random number from the entropy.

8 Claims, 9 Drawing Sheets

INFORMATION PROCESSING APPARATUS

CROSS-REFERENCE TO RELATED APPLICATIONS

This application is based upon and claims the benefit of priority from prior Japanese patent application No. 2019-141154, filed on Jul. 31, 2019, the entire contents of which are incorporated herein by reference.

BACKGROUND

Technical Field

The present invention relates to an information processing apparatus that updates a program stored in a storage.

Related Art

Electronic control units (ECUs) are mounted on a vehicle such as an automobile. The ECUs are information processing apparatuses that control various devices such as an engine, a power steering device, an airbag and a transmission.

The ECU is a microcomputer, and executes software stored in a nonvolatile storage. When the software stored in the nonvolatile storage is updated, the ECU communicates with an update control device to acquire software for update, and rewrites the software stored in the nonvolatile storage with the acquired software for update. The update control device may be referred to as a reprogramming tool.

JP-A-2015-14910 discloses an information distribution system that updates software of an in-vehicle terminal mounted on a vehicle. In the information distribution system according to JP-A-2015-14910, the in-vehicle terminal acquires encrypted software from a server, and decrypts the acquired software. The in-vehicle terminal verifies validity of a software unique key used for decryption before decrypting the acquired software.

SUMMARY

The ECU authenticates the update control device that supplies the software for update before updating the software stored in the storage. In order to prevent the software of the ECU from being updated illegally, security during authentication of the update control device is required to be further increased.

An object of the present disclosure relates to provide an information processing apparatus that improves security during software update.

[1] According to an aspect of the present disclosure, there is provided an information processing apparatus mounted on a vehicle, the information processing apparatus including: a vehicle control unit configured to execute a control program used to control the vehicle; a random number generation unit configured to generate a random number; and an authentication unit configured to authenticate an update control device that controls update of the control program by using the random number generated by the random number generation unit. The random number generation unit includes a first extraction unit configured to extract a bit value having a predetermined length from a count value of a first clock signal, a target bit acquisition unit configured to acquire, in a case where at least one bit position in an entropy stored in a buffer is designated as an update position, a bit value at the update position that is designated as a target bit value, a calculation unit configured to perform logical operation on the bit value extracted by the first extraction unit and the target bit value acquired by the target bit acquisition unit, a replacement unit configured to replace the bit value at the update position with a result of the logical operation obtained by the calculation unit, a position designation unit configured to designate a new update position after the bit value at the update position is replaced with the result of the logical operation, and an output unit configured to generate the random number from the entropy stored in the buffer and output the random number to the authentication unit.

According to [1], in a case where the bit position is designated in the entropy, the calculation unit performs logical operation on the bit value at the designated bit position and the bit value extracted from the count value of the first clock signal. The replacement unit replaces the bit value at the designated bit position with the result of the logical operation obtained by the calculation unit. When the bit value at the designated bit position is replaced, the position designation unit designates the new bit position. Thereby, all the bits included in the entropy may be updated, and randomness of the entropy is increased. In addition, since the entropy is determined based on the count value of the clock signal, the randomness of the entropy is increased. Therefore, according to [1], it may be difficult for a third party to estimate the random number generated from the entropy. According to [1], since the update control device is authenticated based on the random number, security during software update may be improved.

[2] In the information processing apparatus according to [1], the random number generation unit may further include a second extraction unit configured to extract a bit value having a predetermined length from a count value of a clock signal having a second frequency different from a first frequency of the first clock signal, and the calculation unit may include an intermediate calculation unit configured to perform logical operation on the bit value extracted by the first extraction unit and the bit value extracted by the second extraction unit, and a final calculation unit configured to perform logical operation on the obtained target bit value and a result obtained by the intermediate calculation unit. The replacement unit may replace the bit value at the update position with the calculation result obtained by the final calculation unit.

According to [2], since the bit values of the entropy are updated based on two count values acquired from two clock signals, the randomness of the entropy may further be increased.

[3] In the information processing apparatus according to [2], the random number generation unit may further include a third extraction unit configured to extract a bit value having a predetermined length from a count value of a clock signal having a third frequency different from the first frequency and the second frequency, and the intermediate calculation unit performs logical operation on the bit value extracted by the second extraction unit and the bit value extracted by the third extraction unit to generate an intermediate calculation value, and performs logical operation on the intermediate calculation value generated and the bit value extracted by the first extraction unit.

According to [3], since the bit values of the entropy are updated based on three count values acquired from three clock signals, the randomness of the entropy may further be increased.

[4] In the information processing apparatus according to [3], the first frequency may be higher than the second frequency and lower than the third frequency.

According to [4], the intermediate calculation unit first perform logical operation on the bit value extracted from the count value of the second clock signal and the bit value extracted from the count value of the third clock signal. Among frequencies of the first to third clock signals, the frequency of the second clock signal is the lowest, and the frequency of the third clock signal is the highest. Thereby, since patterns of combinations of the count value of the second clock signal and the count value of the third clock signal are increased, the randomness of the result of the logical operation may be increased. The randomness of the entropy may further be increased.

[5] In the information processing apparatus according to any one of [1] to [3], the random number generation unit may further include a counter configured to continue counting the first clock signal in a background while the vehicle control unit or the update control unit is executing interrupt processing, and the target bit acquisition unit acquires the target bit after completion of the interrupt processing.

According to [5], the counter continues counting the first clock signal in the background even when the interrupt processing occurs. Since a period from the occurrence of the interrupt processing to the end thereof is random, the randomness of the bit value extracted from the count value of the first clock signal is increased. The randomness of the entropy may further be increased.

[6] According to an aspect of the present disclosure, there is provided a control method of an information processing apparatus that includes a storage storing a control program used to control a vehicle and that executes the control program, the control method including: extracting a bit value having a predetermined length from a count value of a clock signal; acquiring, in a case where at least one bit position in an entropy stored in a buffer is designated as an update position, a bit value at the designated update position as a target bit value; performing logical operation on the bit value extracted and the target bit value acquired; replacing the bit value at the update position with a result of the logical operation; designating a new update position after the bit value at the update position is replaced; generating a random number from the entropy stored in the buffer; and authenticating an update control device configured to control update of the control program by using the generated random number.

The method according to [6] is used with information processing apparatus according to [1].

According to [6], an information processing apparatus that improves security during software update may be provided.

BRIEF DESCRIPTION OF DRAWINGS

Exemplary embodiment(s) of the present invention will be described in detail based on the following figures, wherein.

DETAILED DESCRIPTION

Hereinafter, embodiments of the present invention will be described in detail with reference to the drawings. In the drawings, the same or equivalent parts are denoted by the same reference numerals, and the description thereof will not be repeated.

[1. Configuration]
[1.1. Configuration of Software Update System 100]

Figure 1:
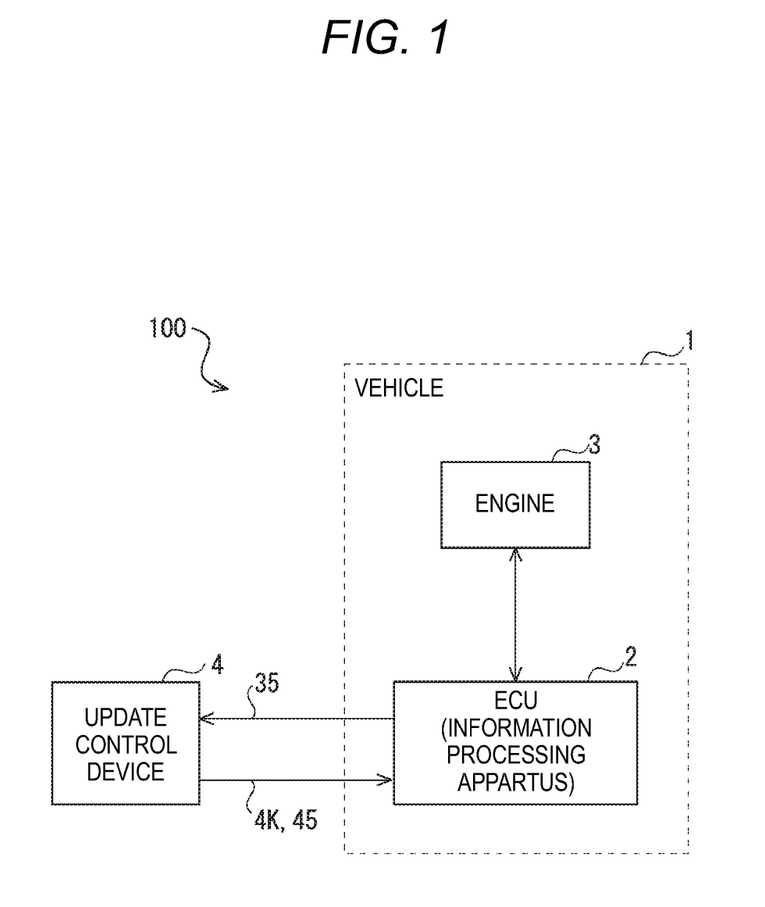
FIG. 1 is a functional block diagram showing a configuration of a software update system including an information processing apparatus according to an embodiment of the present invention.

FIG. 1 is a functional block diagram showing a configuration of a software update system 100 including an information processing apparatus 2 according to an embodiment of the present invention. The software update system 100 updates software executed by the information processing apparatus 2 with reference to FIG. 1. In the following description, "software" and "program" are used interchangeably.

The information processing apparatus 2 is an electronic control unit (ECU) mounted on a vehicle 1. The information processing apparatus 2 controls the vehicle 1. In the present embodiment, the information processing apparatus 2 controls an engine 3 mounted on the vehicle 1. Hereinafter, the information processing apparatus 2 may be referred to as "ECU 2".

The vehicle 1 includes the ECU 2 and the engine 3. In FIG. 1, a configuration of the vehicle 1 other than the ECU 2 and the engine 3 is omitted.

The ECU 2 executes a control program for the engine 3 to control the engine 3. The ECU 2 communicates with an update control device 4 to update the control program for the engine 3. When receiving a random number transmission request 45 from the update control device 4, the ECU 2 transmits a random number 35 used for authentication of the update control device 4 to the update control device 4. The ECU 2 authenticates the update control device 4 using a authentication key 4K received from the update control device 4. Details of updating the control program will be described below.

The engine 3 is a power source of the vehicle 1. The engine 3 generates power and applies a rotational force obtained from the generated power to drive wheels of the vehicle 1.

The update control device 4 communicates with the ECU 2 to update the control program for the engine 3 stored in the ECU 2. Before starting update of the control program, the update control device 4 transmits the random number transmission request 45 to the ECU 2. When receiving the random number 35 from the ECU 2 as a response to a random number transmission request, the update control device 4 generates the authentication key 4K using the received random number 35. When receiving the authentication based on the authentication key 4K from the ECU 2, the update control device 4 transmits a control program for update to the ECU 2.

[1.2. Configuration of ECU 2]

Figure 2:
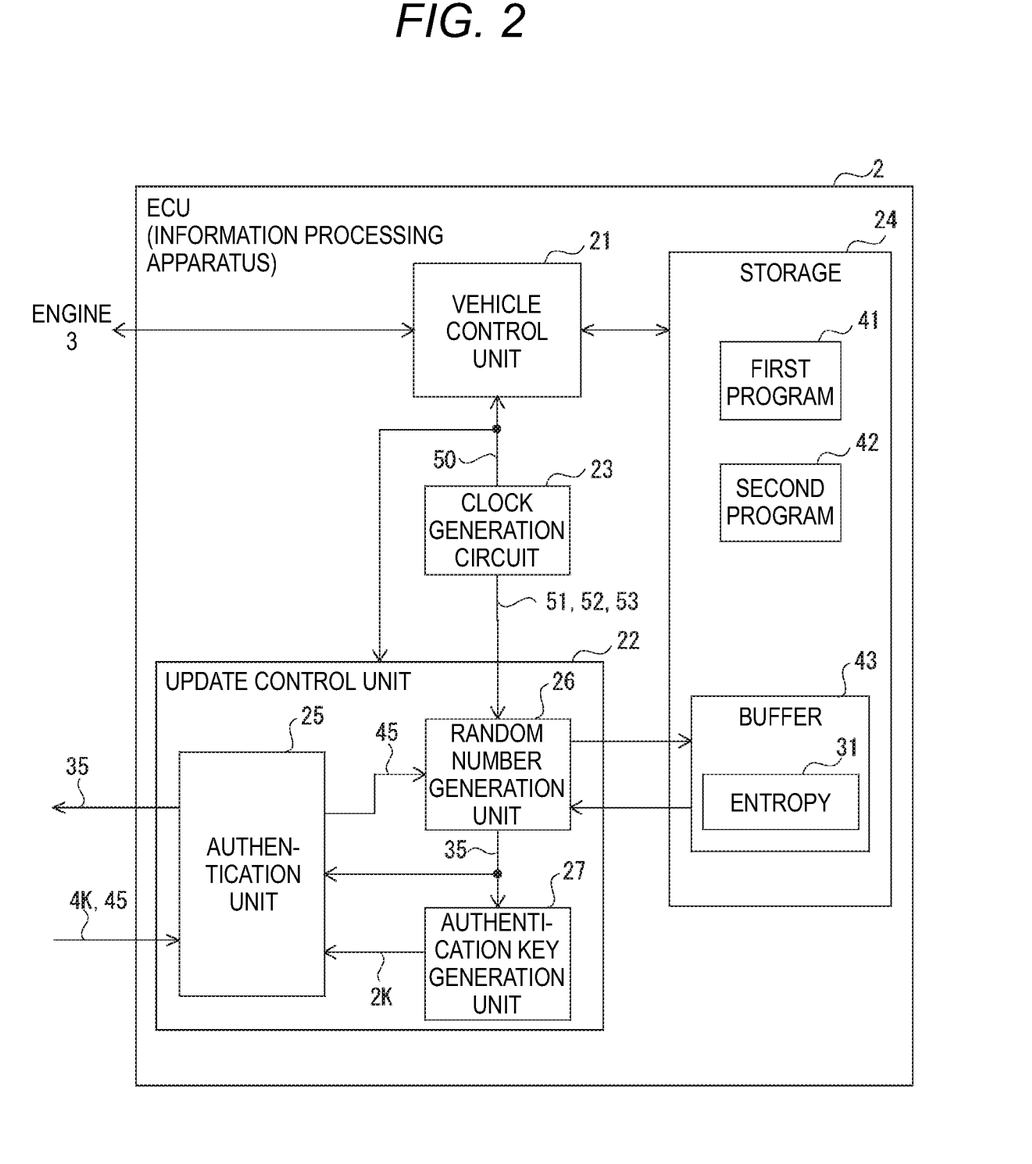
FIG. 2 is a functional block diagram showing a configuration of the information processing apparatus shown in FIG. 1.

FIG. 2 is a functional block diagram showing a configuration of the ECU 2 shown in FIG. 1. The ECU 2 includes a vehicle control unit 21, an update control unit 22, a clock generation circuit 23 and a storage 24 with reference to FIG. 2.

The vehicle control unit 21 executes a first program 41 stored in the storage 24 to control the engine 3. The first program 41 is the control program for the engine 3.

The update control unit 22 executes a second program 42 stored in the storage 24 to update the first program 41 stored in the storage 24. A configuration of the update control unit 22 will be described below.

The clock generation circuit 23 generates clock signals 50 to 53 having different frequencies from each other. The clock signal 50 is output to the vehicle control unit 21 and the update control unit 22. The vehicle control unit 21 and the update control unit 22 operate in synchronization with the clock signal 50 received from the clock generation circuit 23. The clock signals 51 to 53 are output to the update control unit 22 and used to generate an entropy 31 described below.

The frequency of the clock signal 51 is higher than frequencies of the clock signals 52 and 53. The frequency of the clock signal 53 is lower than frequencies of the clock signals 51 and 52.

The storage 24 is nonvolatile, and is a flash memory in the present embodiment. The storage 24 stores the first program 41 and the second program 42. A buffer 43 is set in the storage 24. The buffer 43 stores the entropy 31 used to generate the random number 35.

Figure 3:
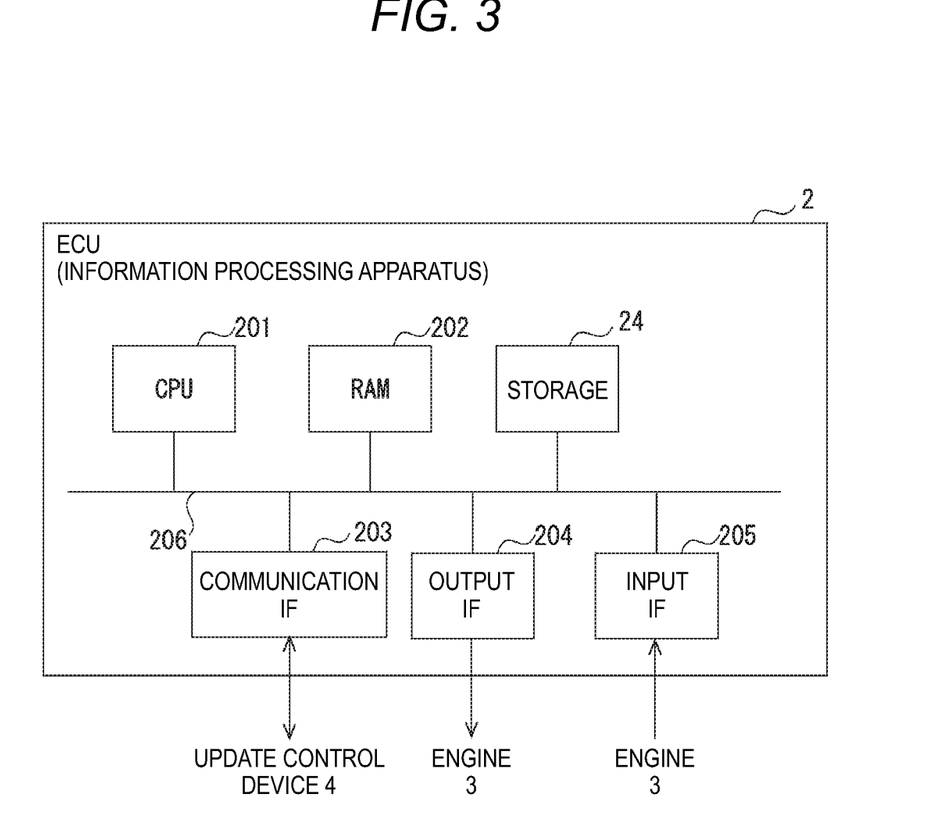
FIG. 3 is a diagram showing a hardware configuration of the information processing apparatus shown in FIG. 1.

FIG. 3 is a block diagram showing a hardware configuration of the ECU 2 shown in FIG. 1. The ECU 2 includes a central processing unit (CPU) 201, a random access memory (RAM) 202, a communication interface 203, an output interface 204, an input interface 205, a bus 206 and the storage 24 with reference to FIG. 3.

The CPU 201 executes a program loaded from the storage 24 into the RAM 202 to control the ECU 2. The RAM 202 is a main memory of the ECU 2. The CPU 201 incorporates the clock generation circuit 23 shown in FIG. 2. The CPU 201 operates in synchronization with the clock signal 50 generated by the clock generation circuit 23.

When the CPU 201 executes the first program 41 loaded into the RAM 202, the CPU 201 operates as the vehicle control unit 21. When the CPU 201 executes the second program 42 loaded into the RAM 202, the CPU 201 operates as the update control unit 22. The CPU 201 does not execute the first program 41 and the second program 42 in parallel.

The communication interface 203 communicates with the update control device 4 using a protocol such as a transmission control protocol (a TCP) and an internet protocol (an IP). A communication method between the ECU 2 and the update control device 4 is not particularly limited.

The output interface 204 outputs a control signal to the engine 3 by using a control area network (a CAN). The input interface 205 receives a detection signal from a temperature sensor or the like attached to the engine 3 by using the CAN.

The bus 206 connects the CPU 201, the RAM 202, the communication interface 203, the output interface 204, the input interface 205 and the storage 24.

[1.3. Configuration of Update Control Unit 22]

The update control unit 22 includes an authentication unit 25, a random number generation unit 26 and an authentication key generation unit 27 with reference to FIG. 2.

The authentication unit 25 communicates with the update control device 4 shown in FIG. 1 to authenticate the update control device 4. Specifically, when receiving the random number transmission request 45 from the update control device 4, the authentication unit 25 transmits the random number 35 generated by the random number generation unit 26 to the update control device 4. The authentication unit 25 receives the authentication key 4K generated by the update control device 4 using the random number 35 from the update control device 4. The authentication unit 25 confirms validity of the update control device 4 based on the received authentication key 4K and an authentication key 2K generated by the authentication key generation unit 27. When the authentication unit 25 can confirm the validity of the update control device 4, update of the first program 41 stored in the storage 24 is started.

The random number generation unit 26 updates the entropy 31 stored in the buffer 43 using the clock signals 51 to 53 received from the clock generation circuit 23. When the random number generation unit 26 receives the transmission request of the random number 35 from the update control device 4, the random number generation unit 26 generates the random number 35 using the updated entropy 31. A configuration of the random number generation unit 26 will be described below.

The authentication key generation unit 27 generates the authentication key 2K using the random number 35 received from the random number generation unit 26. The authentication key generation unit 27 outputs the generated authentication key 2K to the authentication unit 25.

[1.4. Configuration of Random Number Generation Unit 26]

Figure 4:
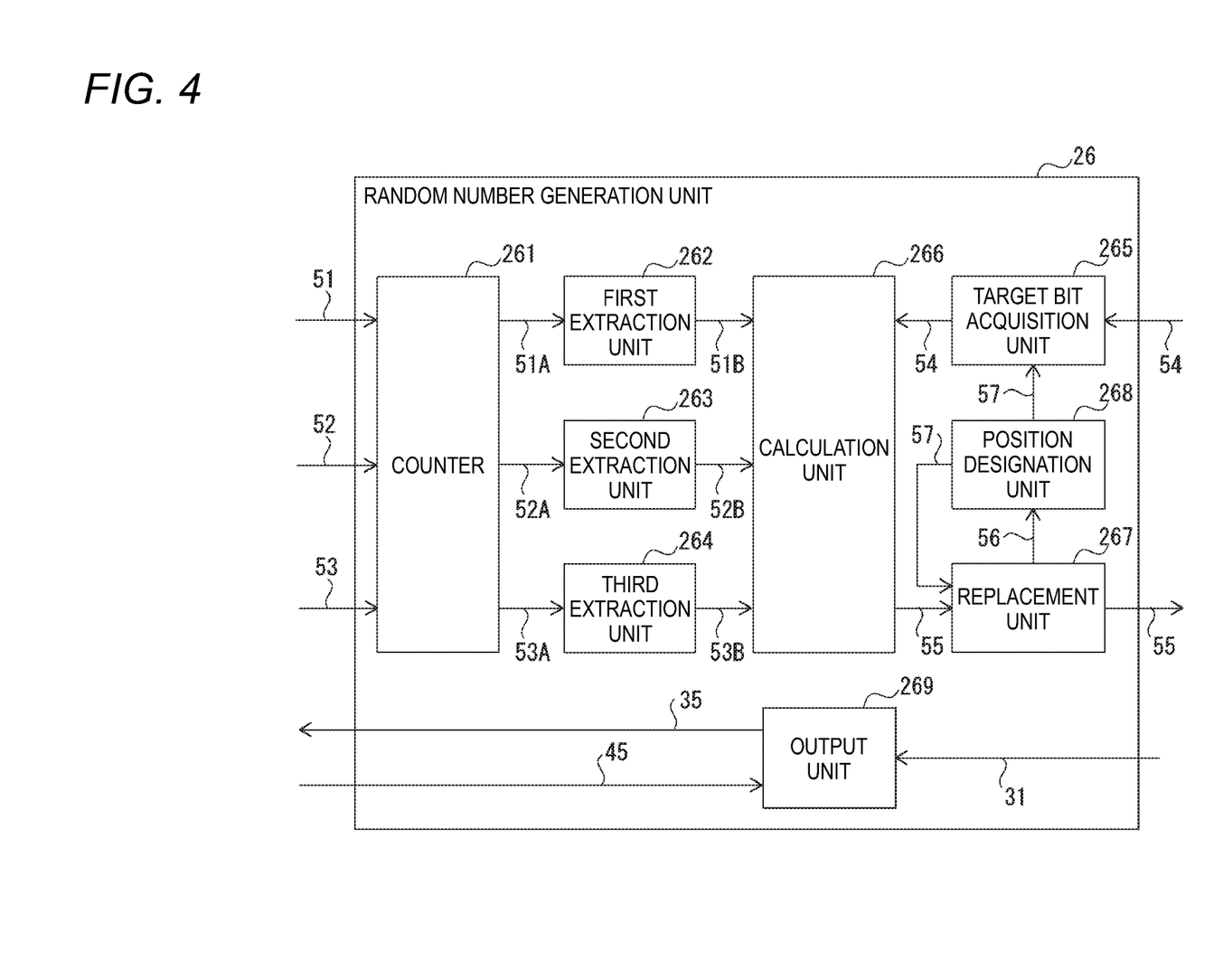
FIG. 4 is a functional block diagram showing a configuration of the random number generation unit shown in FIG. 2.

FIG. 4 is a functional block diagram showing a configuration of the random number generation unit 26 shown in FIG. 2. A counter 261, a first extraction unit 262, a second extraction unit 263, a third extraction unit 264, a target bit acquisition unit 265, a calculation unit 266, a replacement unit 267, a position designation unit 268 and an output unit 269 are included with reference to FIG. 4.

The counter 261 receives the clock signals 51 to 53 from the clock generation circuit 23, and counts the received clock signals 51 to 53. The counter 261 outputs a first count value 51A obtained by counting the clock signal 51 to the first extraction unit 262. The counter 261 outputs a second count value 52A obtained by counting the clock signal 52 to the second extraction unit 263. The counter 261 outputs a third count value 53A obtained by counting the clock signal 53 to the third extraction unit 264.

The first extraction unit 262 receives the first count value 51A from the counter 261 and extracts a bit value of the least significant bit from the received first count value 51A. The first extraction unit 262 extracts the extracted bit value as a first extracted bit value 51B to the calculation unit 266.

The second extraction unit 263 receives the second count value 52A from the counter 261 and extracts a bit value of the least significant bit from the received second count value 52A. The second extraction unit 263 extracts the extracted bit value as a second extracted bit value 52B to the calculation unit 266.

The third extraction unit 264 receives the third count value 53A from the counter 261 and extracts a bit value of the least significant bit from the received third count value 53A. The third extraction unit 264 extracts the extracted bit value as a third extracted bit value 53B to the calculation unit 266.

The target bit acquisition unit 265 acquires a bit value at an update position 57 notified by the position designation unit 268 in the entropy 31 stored in the buffer 43. The target bit acquisition unit 265 outputs the acquired bit value as a target bit value 54 to the calculation unit 266.

The calculation unit 266 receives the first extracted bit value 51B from the first extraction unit 262, receives the second extracted bit value 52B from the second extraction unit 263, and receives the third extracted bit value 53B from the third extraction unit 264. The calculation unit 266 receives the target bit value 54 from the target bit acquisition unit 265. The calculation unit 266 performs logical operation using the received extracted bit values 51B to 53B and the received target bit value 54, and generates an update bit value 55 as a result of the logical operation. The calculation unit 266 outputs the update bit value 55 to the replacement unit 267.

The replacement unit 267 replaces the bit value at the update position 57 designated by the position designation unit 268 in the entropy 31 stored in the buffer 43 with the update bit value 55 received from the calculation unit 266. The replacement unit 267 notifies the position designation unit 268 of a replacement end notification 56 for indicating that the replacement of the bit value at the update position 57 is completed.

When receiving the replacement end notification from the replacement unit 267, the position designation unit 268 changes the update position 57. The position designation unit 268 notifies the target bit acquisition unit 265 and the replacement unit 267 of the changed update position 57.

When receiving the random number transmission request 45 from the authentication unit 25, the output unit 269 reads the entropy 31 from the buffer 43, and converts the read entropy 31 into the random number 35. The output unit 269 outputs the random number 35 converted from the entropy 31 to the authentication key generation unit 27.

[1.5. Configuration of Calculation Unit 266]

Figure 5:
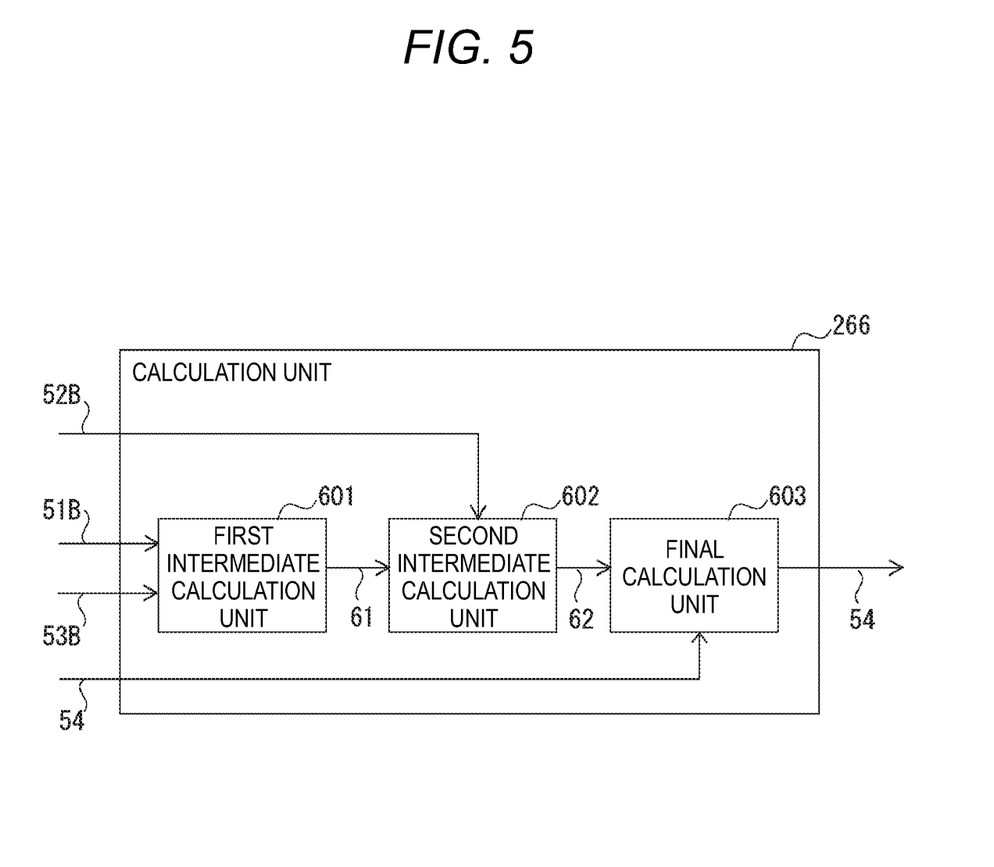
FIG. 5 is a diagram showing a configuration of the calculation unit shown in FIG. 4.

FIG. 5 is a functional block diagram showing a configuration of the calculation unit 266 shown in FIG. 4. The calculation unit 266 includes a first intermediate calculation unit 601, a second intermediate calculation unit 602 and a final calculation unit 603 with reference to FIG. 5.

The first intermediate calculation unit 601 performs logical operation on the first extracted bit value 51B received from the first extraction unit 262 and the third extracted bit value 53B received from the third extraction unit 264. A first intermediate bit value 61 is generated as a result of the logical operation by the first intermediate calculation unit 601.

The second intermediate calculation unit 602 performs logical operation on the second extracted bit value 52B received from the second extraction unit 263 and the first intermediate bit value 61 received from the first intermediate calculation unit 601. A second intermediate bit value 62 is generated as a result of the logical calculation by the second intermediate calculation unit 602.

The final calculation unit 603 performs logical operation on the target bit value 54 received from the target bit acquisition unit 265 and the second intermediate bit value 62 received from the second intermediate calculation unit 602. The final calculation unit 603 generates the update bit value 55 as a result of the logical operation.

[1.6. Allocation of Storage area]

Figure 6:
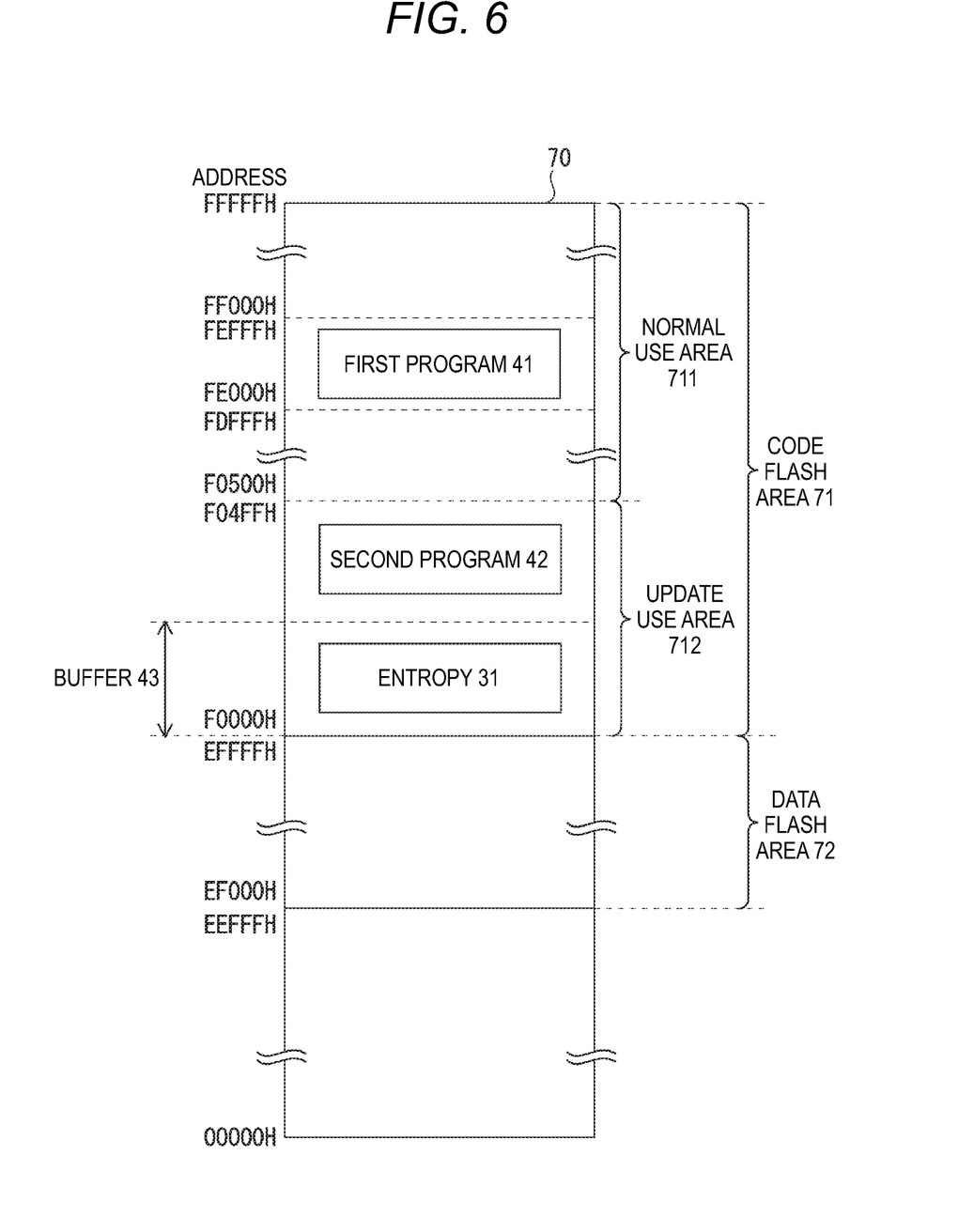
FIG. 6 is a diagram showing an example of allocation of a storage area in the storage shown in FIG. 2.

FIG. 6 is a diagram showing an example of allocation of a storage area 70 in the storage 24 shown in FIG. 2. The storage area 70 includes a code flash area 71 and a data flash area 72 with reference to FIG. 6.

The code flash area 71 is an area that stores a program executed by the CPU 201. The first program 41 and the second program 42 are written in the code flash area 71. The code flash area 71 is divided into a normal use area 711 and an update use area 712.

The normal use area 711 stores a program used to control the vehicle 1. Since the first program 41 is a control program for the engine 3, the first program 41 is written in the normal use area 711. When the CPU 201 operates as the vehicle control unit 21, the second program 42 written in the update use area 712 is not loaded into the RAM 202.

The update use area 712 stores a program used to update the program written in the normal use area 711. Since the second program 42 is used to update the first program 41, the second program 42 is written in the update use area 712. When the CPU 201 operates as the update control unit 22, the program written in the normal use area 711 is not loaded into the RAM 202. This is because, when the first program 41 is loaded into the RAM 202, the update control unit 22 cannot rewrite the first program 41 written in the storage area 70.

A part of the update use area 712 is used as the buffer 43. The buffer 43 stores the entropy 31.

[2. Operation]

[2.1. Operation of Software Update System 100]

Figure 7:
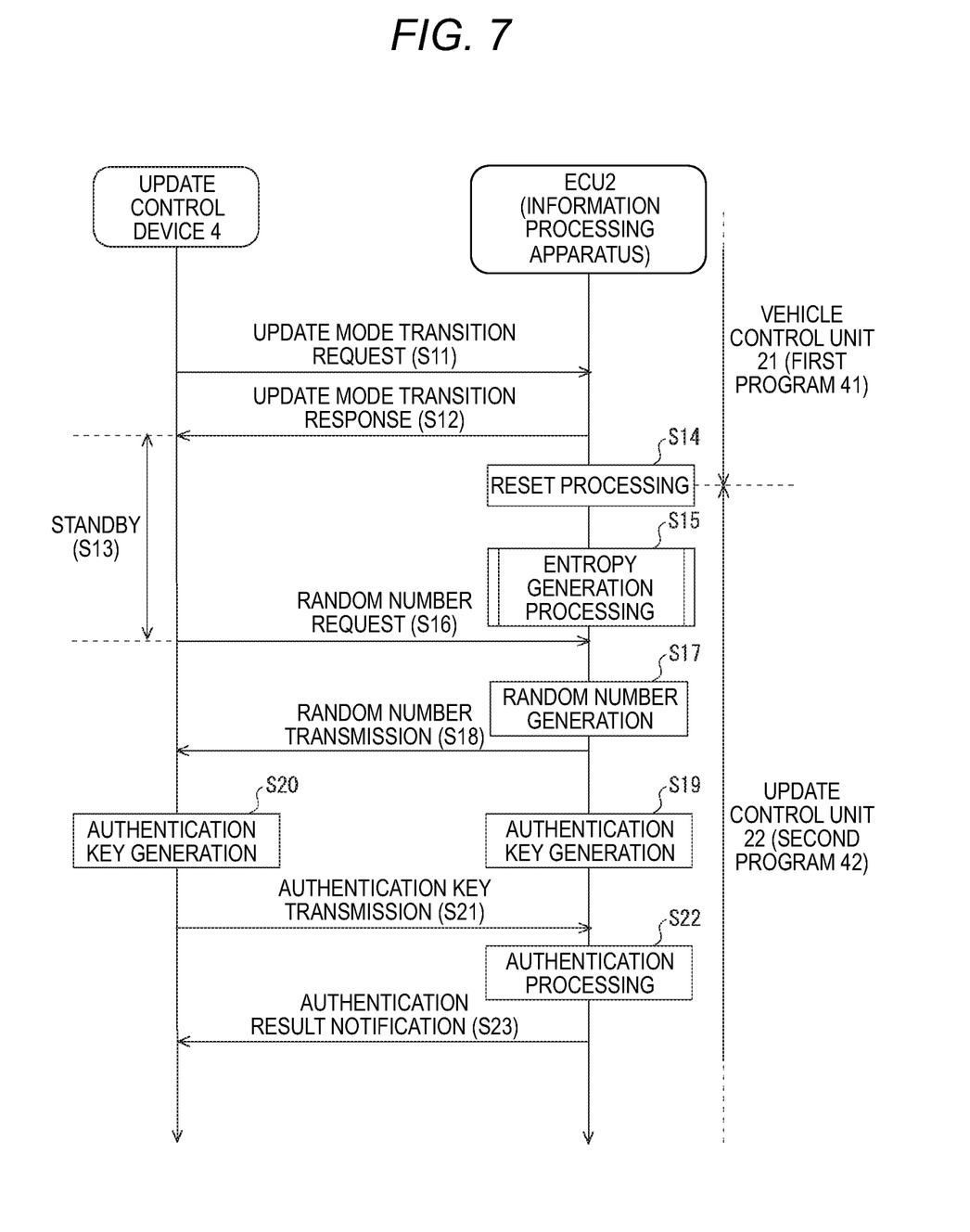
FIG. 7 is a sequence diagram showing an operation of the software update system shown in FIG. 1.

FIG. 7 is a sequence diagram showing an operation of the software update system 100 shown in FIG. 1. The operation of the software update system 100 will be described with reference to FIG. 7. In an initial state, the vehicle control unit 21 operates in synchronization with the clock signal 50, and the update control unit 22 is stopped. That is, the first program 41 is being executed, and the second program 42 is not loaded into the RAM 202. In the initial state, the update of the first program 41 is not started, and the clock signals 51 to 53 are not generated.

When the first program 41 stored in the storage 24 is updated, a driver of the vehicle 1 moves the vehicle 1 to a store of the vehicle 1. In the store, the update control device 4 starts communication with the ECU 2 in response to a manipulation by a worker. Specifically, the update control device 4 transmits an update mode transition request to the ECU 2 (step S11). The update mode transition request is a message for instructing the ECU 2 to activate the update control unit 22.

When receiving the update mode transition request from the update control device 4, the ECU 2 transmits an update mode transition response to the update control device 4 (step S12). The update mode transition response is a message for notifying that transition to an update mode is started.

When receiving the update mode transition response from the ECU 2, the update control device 4 stands by until a predetermined standby time has elapsed (step S13). A length of the standby time is, for example, 5 seconds. The standby time is determined based on an update mode transition time required for the ECU 2 to stop the vehicle control unit 21 and activate the update control unit 22. Specifically, the standby time may be longer than the update mode transition time.

After transmitting the update mode transition response, the ECU 2 executes reset processing (step S14). Specifically, in the ECU 2, the vehicle control unit 21 is stopped, and the update control unit 22 is activated. That is, the second program 42 is loaded into the RAM 202 instead of the first program. The CPU 201 starts the second program 42 loaded into the RAM 202. As the vehicle control unit 21 is stopped, the first program 41 is unloaded from the RAM 202. As a result, the first program 41 written in the code flash area 71 can be updated.

The ECU 2 starts entropy generation processing (step S15). As a result of step S15, bits of the entropy 31 stored in the buffer 43 are updated. The entropy generation processing (step S15) continues until the ECU 2 receives the random number transmission request 45 from the update control device 4. The entropy generation processing (step S15) will be described in detail below.

After the standby time has elapsed, the update control device 4 transmits the random number transmission request 45 to the ECU 2 (step S16). The random number transmission request 45 is a message for requesting transmission of the random number 35 used for authentication of the update control device 4.

When receiving the random number transmission request 45 from the update control device 4, the ECU 2 generates the random number 35 using the entropy 31 stored in the buffer 43 (step S17). As long as the random number 35 is generated based on the entropy 31, a algorithm for generating the random number 35 is not limited. The random number 35 may not be a true random number. That is, the random number 35 may be a pseudo random number. The ECU 2 transmits the generated random number 35 to the update control device 4 (step S18).

In the ECU 2, the authentication key generation unit 27 generates the authentication key 2K using the random number 35 received from the random number generation unit 26 (step S19). The authentication key generation unit 27 outputs the authentication key 2K generated in step S19 to the authentication unit 25.

When receiving the random number 35 from the ECU 2, the update control device 4 generates the authentication key 4K using the received random number 35 (step S20). The update control device 4 transmits the authentication key 4K generated in step S19 to the ECU 2 (step S21).

In steps S19 and S20, the algorithm for generating the authentication key is not particularly limited. For example, advanced encryption standard (AES) is used to generate the authentication key. An encryption key for generating the authentication key 4K may be the same as or different from an encryption key for generating the authentication key 2K.

The authentication unit 25 authenticates the update control device 4 based on the authentication key 4K received from the update control device 4 and the authentication key 2K received from the authentication key generation unit 27 (step S 22). Specifically, the authentication unit 25 compares the authentication key 4K with the authentication key 2K.

When the authentication key 4K does not match the authentication key 2K, the authentication unit 25 determines that the validity of the update control device 4 serving as a transmission source of the authentication key 4K cannot be confirmed. The authentication unit 25 transmits an authentication result notification for notifying that the update control device 4 cannot be authenticated to the update control device 4 (step S23). In this case, the ECU 2 may refuse to receive data transmitted from the update control device 4. Alternatively, the ECU 2 may request retransmission of the authentication key 4K.

When the authentication key 4K matches the authentication key 2K, the authentication unit 25 determines that the validity of the update control device 4 serving as the transmission source of the authentication key 4K is confirmed. The authentication unit 25 transmits an authentication result notification for notifying that the update control device 4 is authenticated to the update control device 4 (step S23). After step S23, the update control device 4 starts transmission of the first program 41 for update. The update control unit 22 updates the first program 41 stored in the normal use area 711 using the first program 41 for update received from the update control device 4.

A method of rewriting the first program 41 stored in the normal use area 711 to the first program 41 for update is not particularly limited. For example, the update control device 4 may collectively transmit the first program 41 for update to the ECU 2. In this case, the ECU 2 may temporarily store the first program 41 for update in a reserved area of the storage area 70, and rewrite the first program 41 stored in the normal use area 711 with the temporarily stored first program 41 for update.

Alternatively, the update control device 4 may divide the first program 41 for update into data of a predetermined size, and transmit the divided data to the ECU 2 together with a command for instructing writing of the divided data. In this case, the update control unit 22 may erase the first program 41 written in the normal use area 711 before starting reception of the divided data. The update control unit 22 writes the divided data received together with the command in the normal use area 711 according to the command received from the update control device 4.

[2.2. Entropy Generation Processing (step S15)]

The random number generation unit 26 counts the clock signals 51 to 53 to generate count values 51A to 53A. The random number generation unit 26 updates the bits of the entropy 31 stored in the buffer 43 one by one using the least significant bit value in the generated count values 51A to 53A. Thereby, the random number generation unit 26 can increase randomness of the entropy 31. Since the random number 35 used to generate the authentication keys 2K and 4K is generated from the entropy 31 having increased randomness, it is difficult for a third party to estimate the random number 35. As a result, the ECU 2 can further improve security during software update.

Figure 8:
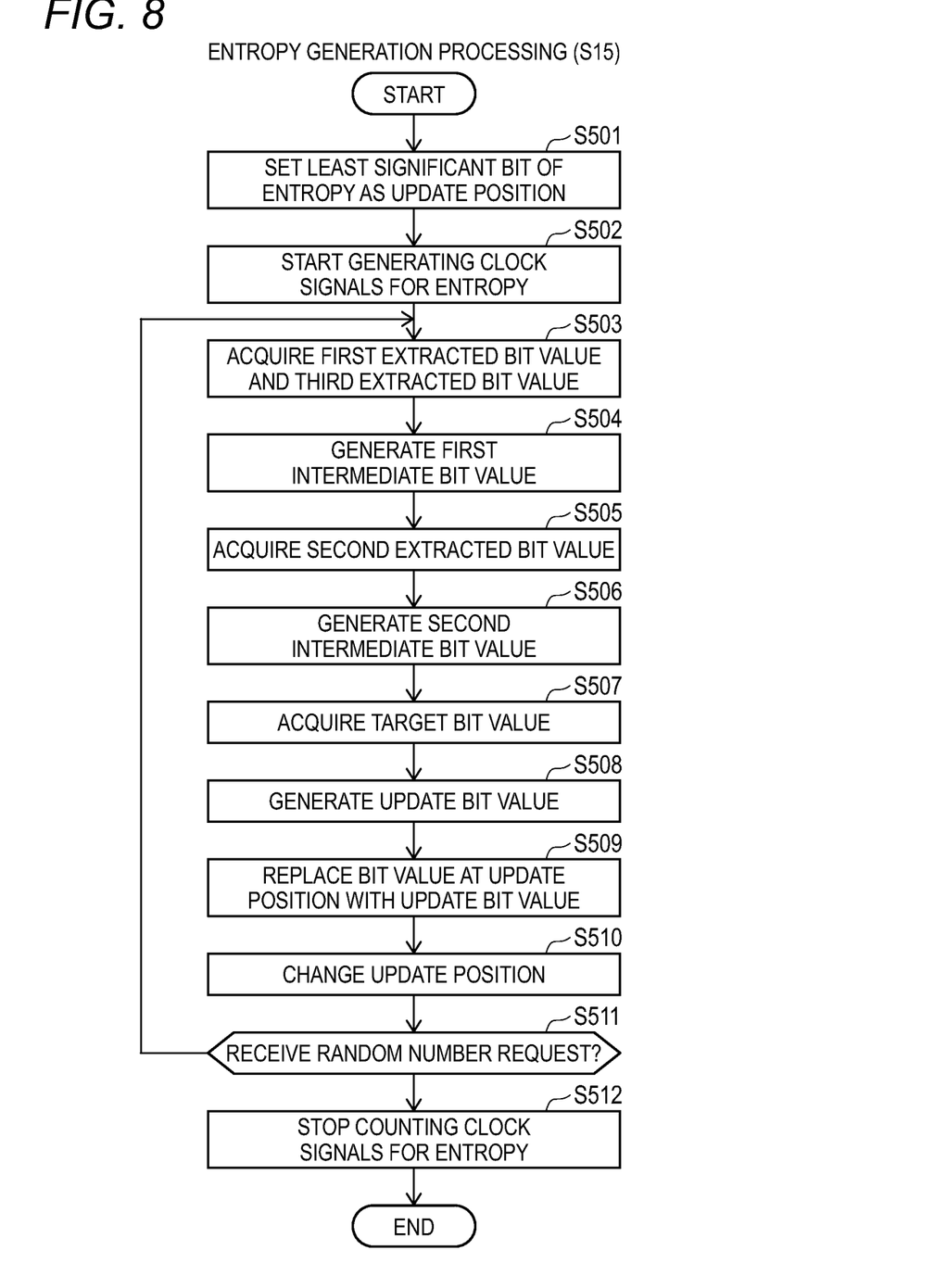
FIG. 8 is a flowchart of entropy generation processing shown in FIG. 7.
Figure 9:
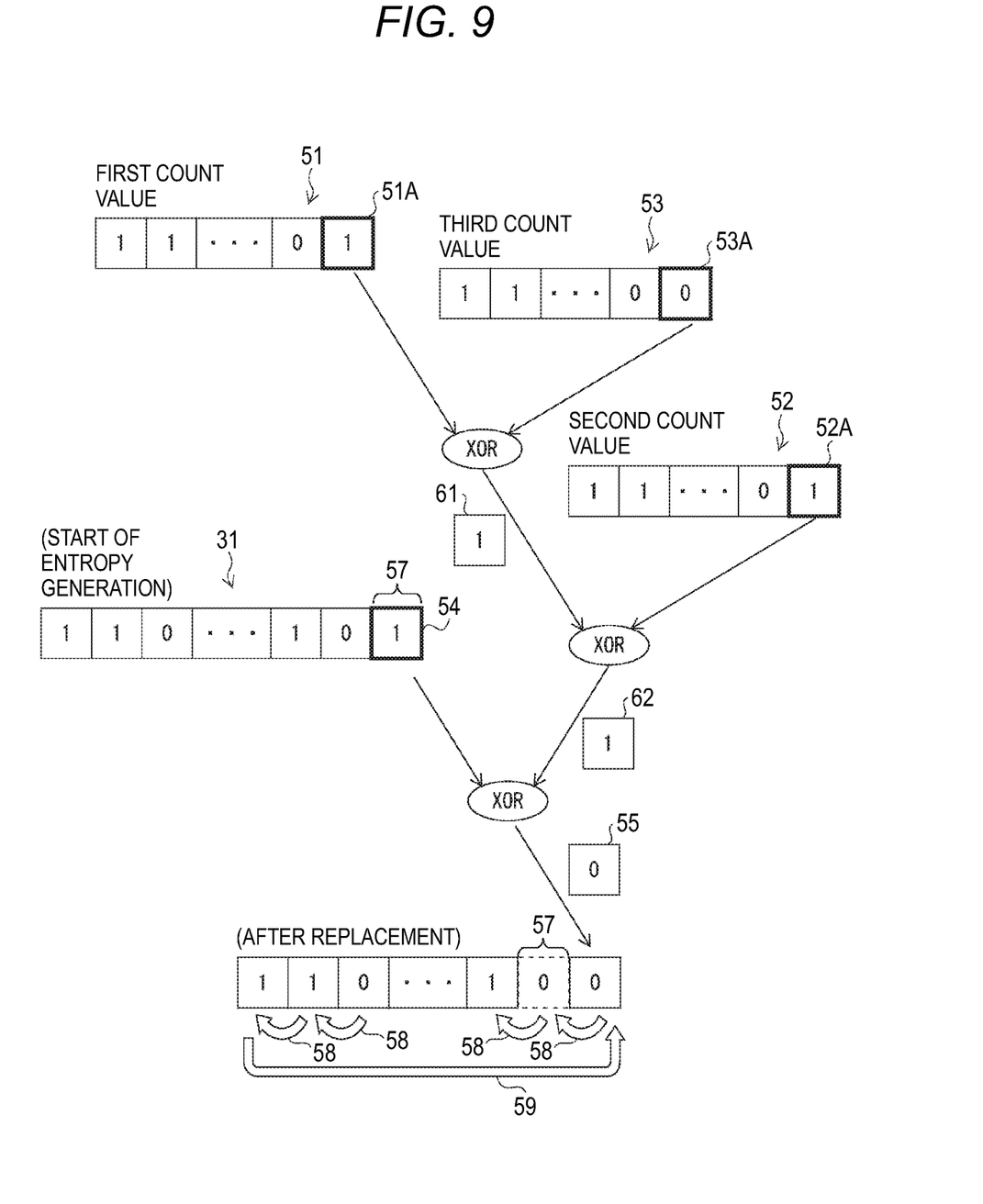
FIG. 9 is a diagram showing an example of logical operation performed by the calculation unit shown in FIG. 4.

The entropy generation processing (step S15) will be described in detail below with reference to both FIGS. 8 and 9. FIG. 8 is a flowchart of the entropy generation processing (step S15) shown in FIG. 7. FIG. 9 is a diagram showing an example of a logical operation performed by the calculation unit 266 shown in FIG. 4.

When the update control unit 22 is activated by the reset processing (step S14) shown in FIG. 7, the random number generation unit 26 starts processing shown in FIG. 8. When the processing shown in FIG. 8 is started, the clock signals 51 to 53 are not generated.

(Designation of First Update Position)

In the random number generation unit 26, the position designation unit 268 designates the least significant bit of the entropy 31 stored in the buffer 43 as the update position 57 (step S501). A data length of the entropy 31 is 128 (bits). In the present embodiment, the least significant bit of the entropy 31 is a right end of the entropy 31 in FIG. 9. The position designation unit 268 notifies the target bit acquisition unit 265 and the replacement unit 267 of the update position 57 designated in step S501.

(Counting Start of Clock Signal)

The counter 261 starts counting the clock signals 51 to 53 used to generate the entropy 31 (step S502). Specifically, the update control unit 22 instructs the clock generation circuit 23 to generate the clock signals 51 to 53. The clock generation circuit 23 generates the clock signals 51 to 53 by dividing an output signal from an electronic oscillator (not shown).

The counter 261 receives the clock signals 51 to 53 from the clock generation circuit 23, and counts the received clock signals 51 to 53. The first count value 51A is generated by counting the clock signal 51. The second count value 52A is generated by counting the clock signal 52. The third count value 53A is generated by counting the clock signal 53.

(Generation of First Intermediate Bit Value 61)

The random number generation unit 26 extracts a bit value of the least significant bit from the first count value 51A and the third count value 53A generated by the counter 261 (step S503).

Specifically, the first extraction unit 262 reads the first count value 51A from the counter 261. The first extraction unit 262 extracts the first extracted bit value 51B from the least significant bit of the read first count value 51A. Similarly to the first extraction unit 262, the third extraction unit 264 extracts the third extracted bit value 53B from the least significant bit of the third count value 53A read from the counter 261. In FIG. 9, the least significant bits of the first count value 51A and the second count value 52A are surrounded by a thick frame.

The first intermediate calculation unit 601 performs logical operation on the first extracted bit value 51B and the third extracted bit value 53B acquired in step S503 to generate the first intermediate bit value 61 (step S504).

Specifically, the first intermediate calculation unit 601 obtains an exclusive OR of the first extracted bit value 51B and the third extracted bit value 53B. The first intermediate calculation unit 601 outputs the obtained exclusive OR as the first intermediate bit value 61 to the second intermediate calculation unit 602. In the example shown in FIG. 9, since the first extracted bit value 51B is "1" and the third extracted bit value 53B is "0", the first intermediate bit value 61 is "1".

The calculation unit 266 can increase the randomness of the entropy 31 by using the first extracted bit value 51B derived from the clock signal 51 and the third extracted bit value 53B derived from the clock signal 53 for a first logical operation. This will be described in detail below.

The frequency of the clock signal 51 is the highest among the frequencies of the clock signals 51 to 53. The first extracted bit value 51B is extracted from the least significant bit of the first count value 51A obtained by counting the clock signal 51. The frequency of the clock signal 53 is the lowest among the frequencies of the clock signals 51 to 53. The third extracted bit value 53B is extracted from the least significant bit of the third count value 53A obtained by counting the clock signal 53.

As a result, in a period when the first extracted bit value 51B is 1, the third extracted bit value 53B is changed at least once. The larger a difference between the frequency of the clock signal 51 and the frequency of the clock signal 53, the larger the number of times the third extracted bit value 53B is changed. As a result, since it is difficult to estimate a combination of the first extracted bit value 51B and the third extracted bit value 53B, randomness of the first intermediate bit value 61 is increased. Since bit values of the entropy 31 are updated based on the first intermediate bit value 61 having increased randomness, the randomness of the entropy 31 is further increased.

It is assumed that the first extracted bit value 51B is a plurality of consecutive bits in the first count value 51A and includes the least significant bit of the first count value 51A. In this case, the third extracted bit value 53B is extracted from the third count value under a condition the same as that of the first extracted bit value 51B. Since each of the first extracted bit value 51B and the third extracted bit value 53B has a plurality of bits, the number of combinations of the first extracted bit value 51B and the third extracted bit value 53B is increased. The number of times the first extracted bit value 51B is changed is larger than those of bit values at other bit positions of the first count value 51A. The same applies to the third extracted bit value 53B. As a result, it is further difficult to estimate the combination of the first extracted bit value 51B and the third extracted bit value 53B. As a result, the randomness of the first intermediate bit value 61 is further increased.

(Generation of second intermediate bit value 62)

After the calculation for obtaining the first intermediate bit value 61 is completed, the second extraction unit 263 acquires the second extracted bit value 52B from the second count value 52A (step S505). Specifically, the second extraction unit 263 reads the second count value 52A from the counter 261 and extracts the bit value of the least significant bit from the read second count value 52A. The second extraction unit 263 acquires the extracted bit value as the second extracted bit value 52B.

The second intermediate calculation unit 602 performs logical operation on the first intermediate bit value 61 generated in step S504 and the second extracted bit value 52B acquired in step S505 to generate the second intermediate bit value 52B (step SS506).

Specifically, the second intermediate calculation unit 602 obtains an exclusive OR of the second extracted bit value 52B and the first intermediate bit value 61. The first intermediate calculation unit 601 outputs the obtained exclusive OR as the second intermediate bit value 62 to the final calculation unit 603. In the example shown in FIG. 9, since the second extracted bit value 52B and the first intermediate bit value 61 are "1", the second intermediate bit value 62 is "0".

When the second intermediate bit value 62 is generated, the second extraction unit 263 acquires the second extracted bit value 52B at a second time different from a first time when the first extraction unit 262 and the third extraction unit 264 acquire the first extracted bit value 51B and the third extracted bit value 53B. Thereby, the randomness of the entropy 31 can be increased. This will be described in detail below.

As described above, the first time is before the calculation for obtaining the first intermediate bit value 61. The second time is after the calculation for obtaining the first intermediate bit value 61. In a period from the first time to the second time, the second count value 52A continues to be increased. Since it is difficult for a third party to estimate the above period, it is also difficult for the third party to estimate a combination of the first intermediate bit value 61 and the second extracted bit value 52B extracted from the second count value 52A. As a result, randomness of the second intermediate bit value 62 is increased. Since the bit values of the entropy 31 are updated based on the second intermediate bit value 62 having increased randomness, the randomness of the entropy 31 is further increased.

(Generation of Update Bit Value 55)

After step S506, the target bit acquisition unit 265 acquires the target bit value 54 from the entropy 31 stored in the buffer 43 (step S507). Specifically, the target bit acquisition unit 265 reads the bit value at the update position 57 designated by the position designation unit 268 from the entropy 31 stored in the buffer 43. The target bit acquisition unit 265 outputs the read bit value as the target bit value 54 to the final calculation unit 603. In the example shown in FIG. 9, the update position 57 is the least significant bit of the entropy 31 stored in the buffer 43.

The final calculation unit 603 performs logical operation on the second intermediate bit value 62 acquired in step S506 and the target bit value 54 acquired in step S507 to generate the update bit value 55 (step S508).

Specifically, the final calculation unit 603 obtains an exclusive OR of the target bit value 54 and the second intermediate bit value 62. The final calculation unit 603 outputs the obtained exclusive OR as the update bit value 55 to the replacement unit 267. In the example shown in FIG. 9, the target bit value 54 is "1", and the second intermediate bit value 62 is "1". Since the update bit value 55 is the exclusive OR of the target bit value 54 and the second intermediate bit value 62, the update bit value 55 is "0".

(Update of Entropy 31)

The replacement unit 267 replaces the bit value at the update position 57 designated by the position designation unit 268 in the entropy 31 stored in the buffer 43 with the update bit value 55 acquired in step S508 (step SS509).

In the example shown in FIG. 9, the update position 57 is the least significant bit of the entropy 31 stored in the buffer 43. Therefore, the replacement unit 267 replaces the bit value "1" of the least significant bit of the entropy 31 with the update bit value 55. As a result, the bit value of the least significant bit of the entropy 31 is changed to "0".

(Change of Update Position)

After step S509, the position designation unit 268 changes the update position 57 (step S510). Specifically, the position designation unit 268 designates a position of a bit that is higher than the bit at the current update position 57 in the entropy 31 stored in the buffer 43 and adjacent to the update position 57 as the new update position 57. That is, the new update position 57 is one bit higher than the current update position 57.

In the example shown in FIG. 9, the current update position 57 is the least significant bit of the entropy 31 stored in the buffer 43. The position designation unit 268 designates the position of the bit located on the left of the least significant bit of the entropy 31 as the new update position 57. In the entropy 31 shown in FIG. 9, the bit at the new update position 57 is indicated by a broken line.

(Change of Update Position)

The random number generation unit 26 determines whether the authentication unit 25 receives the random number transmission request 45 from the update control device 4 (step S511). When the authentication unit 25 does not receive the random number transmission request 45 from the update control device 4 (No in step S511), the random number generation unit 26 executes steps S503 to S510 to update a bit value of the new update position 57.

By repeating the designation of the new update position 57 (step S510) by the position designation unit 268, each bit of the entropy 31 is designated as the update position 57. A change in the update position 57 will be described with reference to FIG. 9. As indicated by arrows 58, the position designation unit 268 designates the bit position one bit higher than the current update position as the new update position 57. By repeating step S510 by the position designation unit 268, the update position moves one by one to the higher bit position of the entropy 31.

When the current update position 57 is the most significant bit of the entropy 31 stored in the buffer 43, the position designation unit 268 designates the least significant bit of the entropy 31 as the new update position, as indicated by an arrow 59.

The description returns to step S511. When the authentication unit 25 receives the random number transmission request 45 from the update control device 4 (Yes in step S511), the counter 261 stops counting the clock signals 51 to 53 (step S512). Thereafter, the random number generation unit 26 ends the processing shown in FIG. 8.

(Occurrence of Interrupt Processing)

When interrupt processing occurs during the execution of the entropy generation processing (step S15), the random number generation unit 26 continues counting the clock signals 51 to 53. During the execution of the interrupt processing by the vehicle control unit 21 or the update control unit 22, the random number generation unit 26 stops updating the bits of the entropy 31 stored in the buffer 43. That is, when the interrupt processing occurs, the random number generation unit 26 sets priorities of processing of steps S503 to S510 shown in FIG. 8 to be lower than a priority of the interrupt processing. In this case, while the counting of the clock signals 51 to 53 is continued, the designation of the update position 57 in the entropy 31 and the replacement of the bit value at the update position 57 are stopped.

When the interrupt processing is completed, the random number generation unit 26 resumes the processing of steps S503 to S510 shown in FIG. 8. The counting of the clock signals 51 to 53 is continued even during the execution of the interrupt processing. A period from the occurrence of the interrupt processing to the end thereof is random. Therefore, randomness of the first extracted bit value 51B, the second extracted bit value 52B and the third extracted bit value 53B obtained immediately after the end of the interrupt processing is increased. Accordingly, since the random number generation unit 26 can increase the randomness of the entropy 31, it may be difficult for a third party to estimate the random number 35.

When the update control device 4 requests the random number 35 during the occurrence of the interrupt processing, the random number generation unit 26 may end the entropy generation processing (step S15). In this case, the random number generation unit 26 generates the random number 35 based on the entropy 31 before the interruption processing occurs. Alternatively, when the interrupt processing is completed, the random number generation unit 26 may end the entropy generation processing (step S15) after executing the processing of steps S503 to S510 shown in FIG. 8 once.

(Frequency of Clock Signals 51 to 53)

A relationship between the frequencies of the clock signals 51 to 53 will be described. The frequency of the clock signal 51 is different from an integer multiple of the frequencies of the clock signals 52 and 53. The frequency of the clock signal 52 is different from an integer multiple of the frequency of the clock signal 53.

The frequency of the clock signal 51 is different from an integer multiple of the frequency of the clock signal 53. In this case, the least common multiple of the frequency of the clock signal 51 and the frequency of the clock signal 53 can be increased. As randomness of the combination of the first extracted bit value 51B based on the clock signal 51 and the third extracted bit value 53B based on the clock signal 53 is improved, the randomness of the first intermediate bit value 61 is improved. As a result, since reproducibility of the entropy 31 is reduced, the ECU 2 can improve the security when the first program 41 is updated.

The frequency of the clock signal 52 is different from an integer multiple of the frequency of the clock signal 51, and is different from the integer multiple of the frequency of the clock signal 53. The first intermediate bit value is calculated from the first extracted bit value 51B and the third extracted bit value 53B. The randomness of the second intermediate bit value 62 is improved as the randomness of the combination of the second extracted bit value 52B and the first intermediate bit value 61 is improved. As a result, since the reproducibility of the entropy 31 is reduced, the ECU 2 can improve the security when the first program 41 is updated.

As described above, when the bit value at the update position 57 is updated, the position designation unit 268 designates the new update position 57. Whenever the new update position 57 is designated, generation of the update bit value 55 is repeated. As a result, the bits of the entropy 31 stored in the buffer 43 are updated. Since the bit value updated in steps S503 to S511 shown in FIG. 8 is random as described below, the randomness of the entropy 31 can be improved.

[Modification]

Although the example in which the update position 57 is designated by bit by bit has been described in the above embodiment, the present invention is not limited thereto. The position designation unit 268 may designate a plurality of bit positions as the update position 57 in the entropy 31 stored in the buffer 43. Preferably, the plurality of designated bit positions are consecutive.

For example, when two consecutive bit positions are designated as the update position 57, the first extraction unit 262 extracts, from the first count value 51A, the first extracted bit value 51B from two consecutive bit positions including the least significant bit. The same applies to the second extraction unit 263 and the third extraction unit 264. When the position designation unit 268 designates the plurality of bit positions as the update position 57, the number of combinations of the first extracted bit value 51B and the third extracted bit value 53B is increased. As a result, since the randomness of the entropy 31 is increased, it may be more difficult to estimate the first intermediate bit value 61.

Although the example in which the first extraction unit 262 extracts the bit value of the least significant bit of the first count value 51A as the first extracted bit value 51B has been described in the above embodiment, the present invention is not limited thereto. The first extraction unit 262 may extract a bit value from a bit position other than the least significant bit of the first count value 51A. The same applies to the second extraction unit 263 and the third extraction unit 264.

Although the example in which the calculation unit 266 first perform logical operation on the first extracted bit value 51B and the third extracted bit value 53B has been described in the above embodiment, the present invention is not limited thereto. The combination of two bit values on which logical operation is performed is not particularly limited.

Although the example in which the calculation unit 266 acquires an exclusive OR of two bit values has been described in the above embodiment, the present invention is not limited thereto. The calculation unit 266 may use logical disjunction (OR), logical conjunction (AND) or the like. That is, the calculation unit 266 may perform logical operation on the two bit values. Alternatively, the calculation unit 266 may use a combination of a plurality of logical operations such as OR, AND and exclusive OR.

Although the example in which the random number generation unit 26 starts the entropy generation processing (step S15) when the update control unit 22 is activated has been described in the above embodiment, the present invention is not limited thereto. The random number generation unit 26 may start the entropy generation processing (step S15) when the vehicle control unit 21 is operating. In this case, the random number generation unit 26 may end the entropy generation processing (step S15) at any timing until the ECU 2 receives the random number transmission request 45 from the update control device 4. When the random number generation unit 26 starts the entropy generation processing (step S15) during the operation of the vehicle control unit 21, the random number generation unit 26 may be stored in the storage 24 as a program different from the second program 42.

Although the example in which the counter 261 counts the clock signals 51 to 53 has been described in the above embodiment, the present invention is not limited thereto. For example, the counter 261 may not count the clock signal 53. The calculation unit 266 performs logical operation on the first extracted bit value 51B and the second extracted bit value 52B to generate an intermediate bit value. The calculation unit 266 outputs a result of the logical operation performed on the generated intermediate bit value and the target bit value 54 to the replacement unit 267 as the updated bit value 55. Even in this case, since the bit values of the entropy 31 are updated, it may be difficult to estimate the random number generated from the entropy 31.

Alternatively, the counter 261 may count only the clock signal 51. The calculation unit 266 outputs a result of the logical operation on the first extracted bit value 51B and the target bit value 54 to the replacement unit 267 as the update bit value 55. Even in this case, since the bit values of the entropy 31 are updated, it may be difficult to estimate the random number generated from the entropy 31.

Although the embodiment according to the present invention has been described above, the embodiment described above is merely an example for implementing the present invention. Therefore, the present invention is not limited to the embodiment described above, and can be implemented by appropriately modifying the embodiment described above without departing from the scope of the present invention.

What is claimed is:

1. An information processing apparatus mounted on a vehicle, the information processing apparatus comprising a hardware processor configured to:
   execute a control program used to control the vehicle;
   generate a random number; and
   authenticate an update control device that controls update of the control program by using the generated random number,
   wherein the generating of the random number includes
      extracting a first bit value having a predetermined length from a count value of a first clock signal,
      acquiring, in a case where at least one bit position in an entropy stored in a buffer is designated as an update position, a bit value at the update position that is designated as a target bit value,
      performing a logical operation on the extracted first bit value and the acquired target bit value to obtain a result of the logical operation,
      replacing the bit value at the update position with the result of the logical operation,
      designating a new update position after the bit value at the update position is replaced with the result of the logical operation, and
      generating the random number from the entropy stored in the buffer and outputting the random number to authenticate the update control device.

2. The information processing apparatus according to claim 1,
   wherein the generating of the random number by the hardware processor further includes
      extracting a second bit value having a predetermined length from a count value of a clock signal having a second frequency different from a first frequency of the first clock signal, the performing of the logical operation to obtain the result of the logical operation includes
performing a logical operation on the first extracted bit value and the second extracted bit value to obtain an intermediate calculation result, and
performing a logical operation on the acquired target bit value and the intermediate calculation result to obtain a final calculation result, and
the replacing of the bit value at the update position is performed such that the bit value at the update position is replaced with the final calculation result.

3. The information processing apparatus according to claim 2,
wherein the generating of the random number by the hardware processor further includes
extracting a third bit value having a predetermined length from a count value of a clock signal having a third frequency different from the first frequency and the second frequency, and
the intermediate calculation result is obtained by performing a logical operation on (i) the first extracted bit value and (ii) a value obtained by performing a logical operation on the second extracted bit value and the third extracted bit value.

4. The information processing apparatus according to claim 3,
wherein the first frequency is higher than the second frequency and lower than the third frequency.

5. The information processing apparatus according to claim 3,
wherein the generating of the random number by the hardware processor further includes
continuing counting the first clock signal in a background while the hardware processor is executing interrupt processing, and
the acquiring of the target bit value is performed after completion of the interrupt processing.

6. The information processing apparatus according to claim 2,
wherein the generating of the random number by the hardware processor further includes
continuing counting the first clock signal in a background while the hardware processor is executing interrupt processing, and
the acquiring of the target bit value is performed after completion of the interrupt processing.

7. The information processing apparatus according to claim 1,
wherein the generating of the random number by the hardware processor further includes
a continuing counting the first clock signal in a background while the hardware processor is executing interrupt processing, and
the acquiring of the target bit value is performed after completion of the interrupt processing.

8. A control method of an information processing apparatus that includes a storage storing a control program used to control a vehicle and that executes the control program, the control method comprising:
extracting a bit value having a predetermined length from a count value of a clock signal;
acquiring, in a case where at least one bit position in an entropy stored in a buffer is designated as an update position, a bit value at the designated update position as a target bit value;
performing a logical operation on the bit value extracted and the target bit value acquired;
replacing the bit value at the update position with a result of the logical operation;
designating a new update position after the bit value at the update position is replaced;
generating a random number from the entropy stored in the buffer; and
authenticating an update control device configured to control update of the control program by using the generated random number.

* * * * *